No. 690,233. Patented Dec. 31, 1901.
C. CHRISTIANSSON.
METHOD OF MANUFACTURING BOTTLES, JARS, &c.
(Application filed Jan. 17, 1900.)
(No Model.) 5 Sheets—Sheet 2.
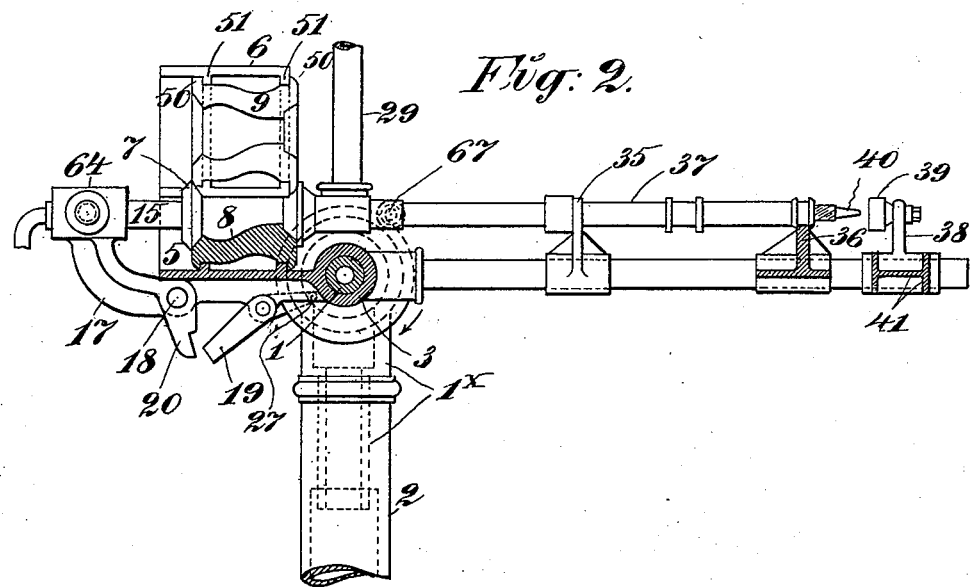
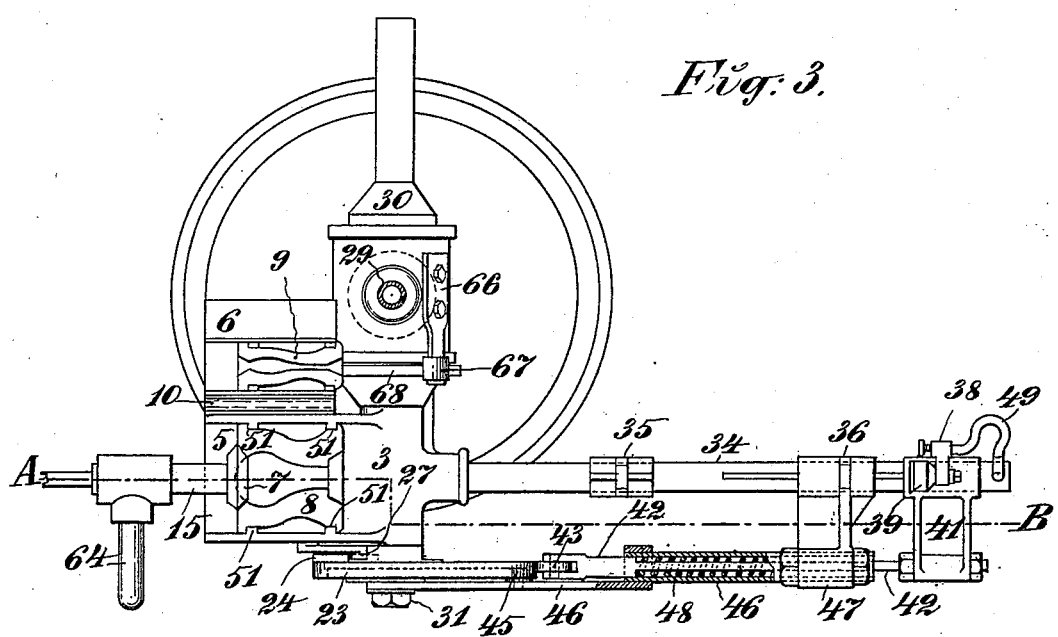

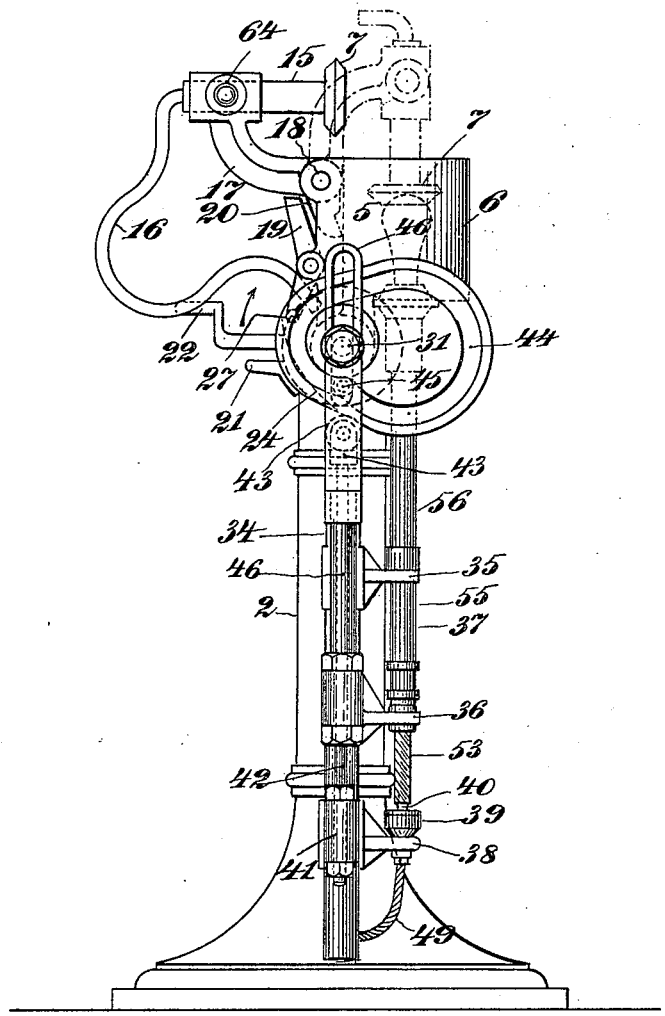

No. 690,233. Patented Dec. 31, 1901.
C. CHRISTIANSSON.
METHOD OF MANUFACTURING BOTTLES, JARS, &c.
(Application filed Jan. 17, 1900.)
(No Model.) 5 Sheets—Sheet 3.
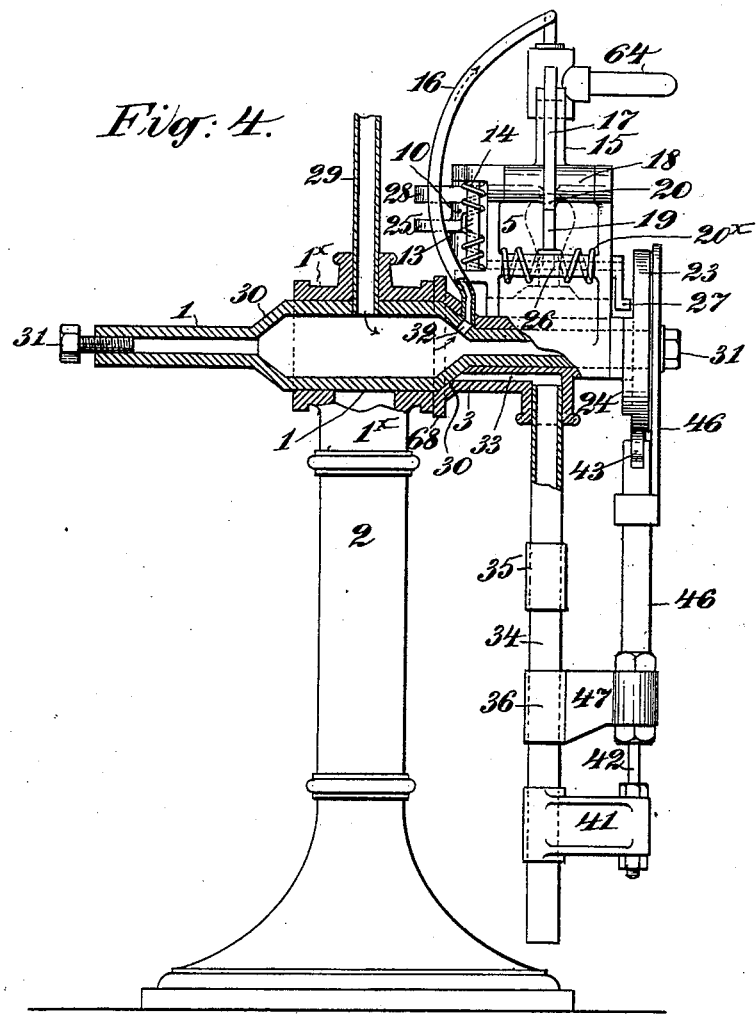
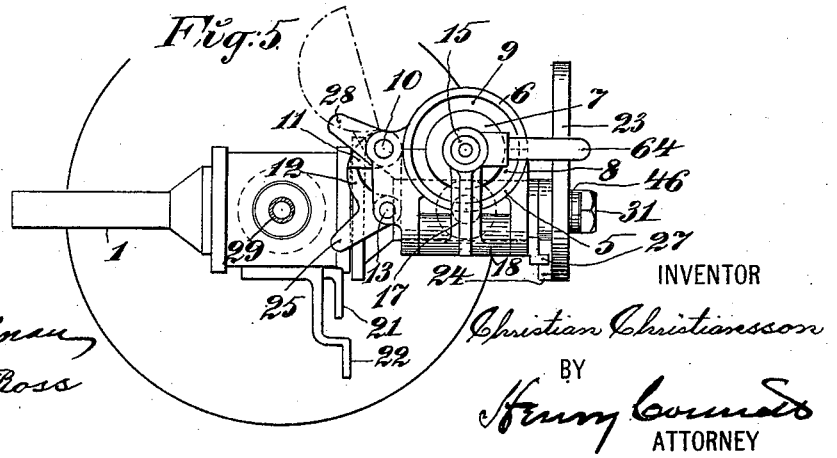
WITNESSES: INVENTOR
Christian Christiansson
BY
ATTORNEY

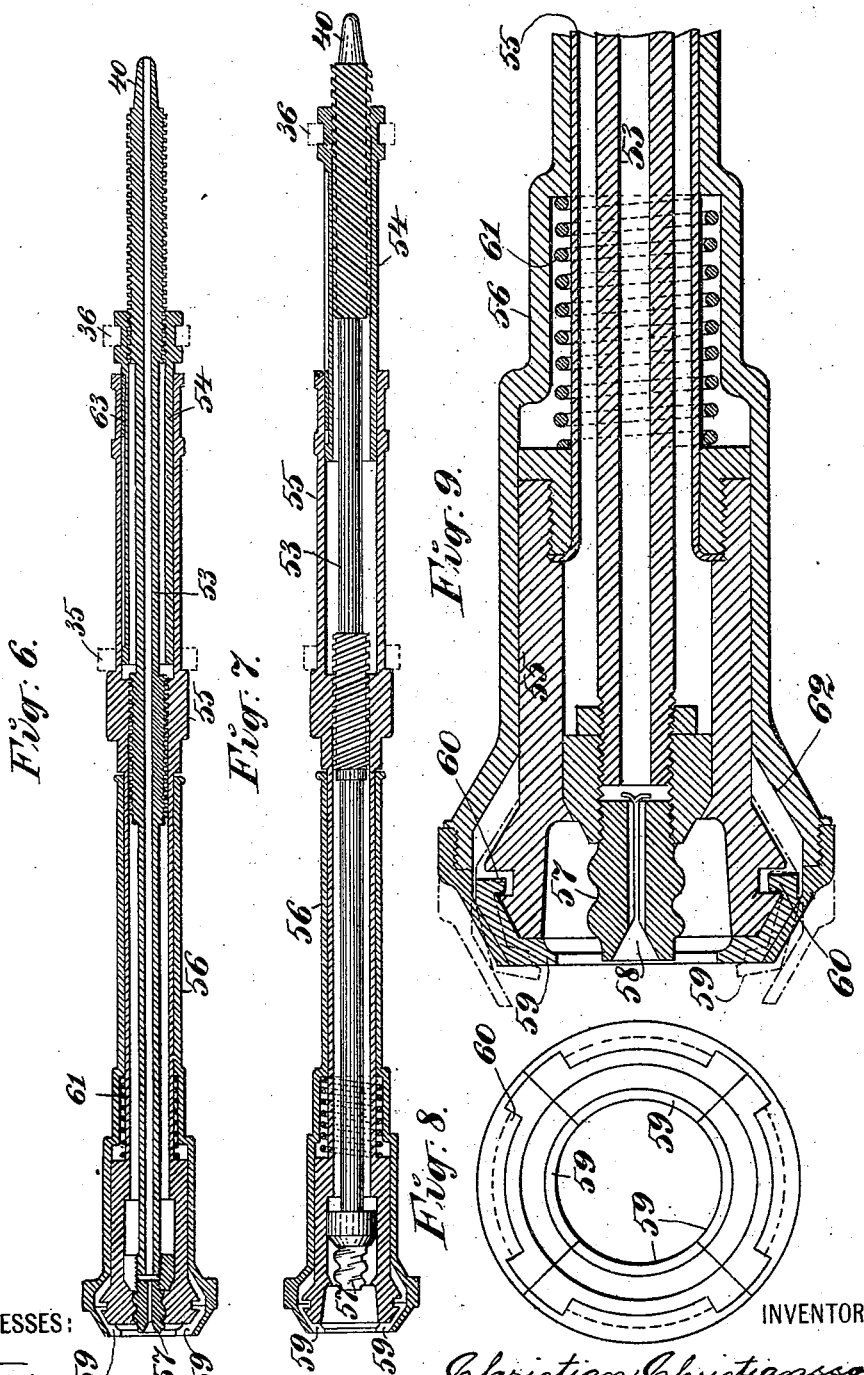

No. 690,233. Patented Dec. 31, 1901.
C. CHRISTIANSSON.
METHOD OF MANUFACTURING BOTTLES, JARS, &c.
(Application filed Jan. 17, 1900.)
(No Model.) 5 Sheets—Sheet 5.
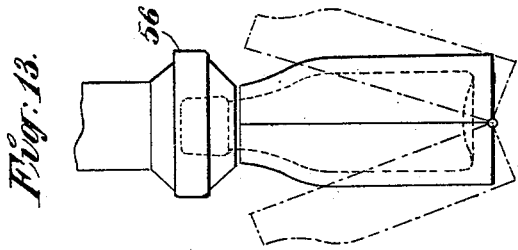
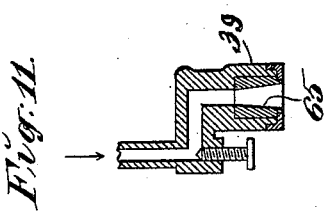
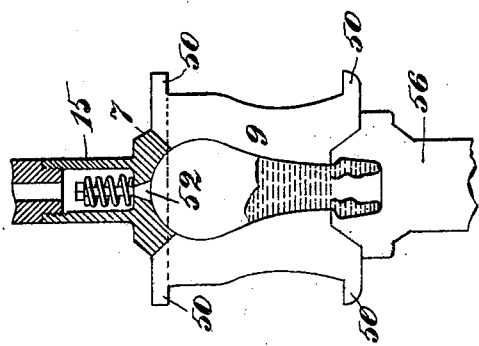
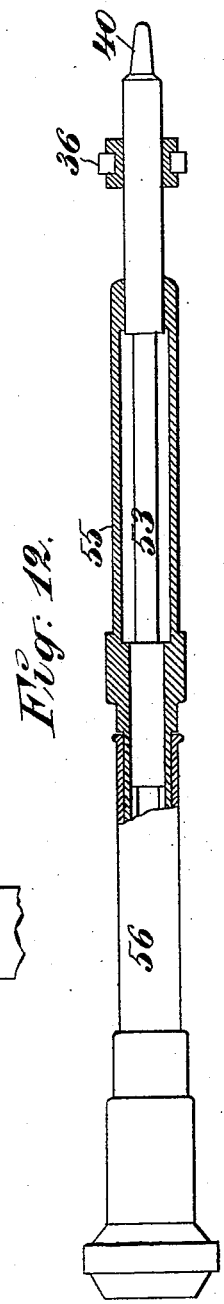
WITNESSES:
F. W. Hyman
Peter A. Ross
INVENTOR
Christian Christiansson
BY
Henry Connett
ATTORNEY
THE NORRIS PETERS CO., PHOTO-LITHO., WASHINGTON, D. C.

UNITED STATES PATENT OFFICE.

CHRISTIAN CHRISTIANSSON, OF SURTE, SWEDEN, ASSIGNOR TO SURTE AKTIEBOLAG, OF SURTE, SWEDEN.

METHOD OF MANUFACTURING BOTTLES, JARS, &c.

SPECIFICATION forming part of Letters Patent No. 690,233, dated December 31, 1901.

Application filed January 17, 1900. Serial No. 1,803. (No model.)

*To all whom it may concern:*

Be it known that I, CHRISTIAN CHRISTIANSSON, modeler, a subject of the King of Sweden and Norway, and a resident of Surte, in the Kingdom of Sweden, have invented certain new and useful Improvements in the Method of Manufacturing Bottles, Jars, and Like Articles, (for which I have filed applications for patent in Sweden the 17th day of June, 1899, under No. 1,070/99; in Norway the 3d day of August, 1899, under No. 11,470; in Germany the 14th day of August, 1899, under No. C 8,462, VI/32; in England the 14th day of December, 1899, under No. 24,895; in Denmark the 16th day of December, 1899, under No. 1,370/99; in France the 16th day of December, 1899, under No. 283,511, and in Belgium the 16th day of December, 1899, under No. 115,670,) of which the following is a specification, reference being had therein to the accompanying drawings.

The invention relates to a method for the manufacture of bottles, jars, and like articles. The method consists in producing by means of a detachable blowpipe provided with a divided mold for the formation of the rim or head of the bottle a hollow partly-finished article, here termed "ingot," in a machine provided with a divided primary mold and in which the blowpipe has been inserted, and subsequently removing the blowpipe, together with said ingot, from the machine and completing the blowing of the bottle, &c., in usual manner in a finishing-mold.

The advantage of the method which will be described in detail in the following lies in the fact that the part of the work best adapted for execution by mechanical means—viz., the formation of the hollow ingot with the rim or head—is given to the machine to perform, while the finishing labor, consisting in giving to the ingot the accurate bottle shape alternatively while revolving the ingot for producing so-called "twisted" bottles, is more directly performed by a workman, who is thus in position to exercise a closer control of the work. An excellent product is thereby obtained, and at the same time the production can with the same force of workmen be brought up to double that ordinarily obtained. This is due to the fact that the machine operates at a speed enabling it to supply ingots to several workmen alternately. The machine works in well-known manner by the aid of compressed air introduced into the mold in two distinct operations, one for forcing the molten glass introduced in the mold into the contracted portion of the latter for the formation of the rim or head and the other for forming the cavity in the ingot. The characteristic features of the machine are partly the devices for automatically admitting the air by different channels into the mold, this being accomplished by causing the rotatable support sustaining the mold to act during the rotation of the latter as a cock alternately transmitting and shutting off the compressed air, and partly the devices for controlling automatically a plunger arranged in the blowpipe and serving for the shaping of the mouth of the bottle. The said plunger is made threaded or smooth, according as the said mouth is to be threaded or smooth. In the former case—*i. e.*, when the plunger is threaded—special provisions are made for its rotation, as will be more fully understood from the following.

In the accompanying drawings the machine is shown in Figure 1 in a front elevation with the mold in a vertical position, in Fig. 2 in a front view in section on line A B of Fig. 3 and in position for the insertion or removal of the blowpipe, in Fig. 3 in the same position in a plan view, in Fig. 4 viewed from one side, partially in section, with the mold in vertical position, and in Fig. 5 in the same position in a plan view. Fig. 6 shows the blowpipe in a longitudinal section with the plunger pushed forward, and Fig. 7 the same in longitudinal section with the plunger withdrawn. Fig. 8 shows portions of the blowpipe viewed from the forward end of the latter, and Fig. 9 shows, on an enlarged scale, the forward end of said pipe in a longitudinal section. Fig. 10 shows the cover of the mold in section; Fig. 11, a funnel for the nozzle of the blowpipe, and Fig. 12 a modified arrangement of the blowpipe. Fig. 13 shows the divided finishing-mold.

The framework is composed of the horizontal hollow shaft 1, which carries at each end a molding mechanism, only one of which is shown in the drawings, and is pivoted on the standard 2 by means of a gudgeon or pivot-pin 1×, rigidly attached to the shaft, so that when one of the molding apparatus has become heated the other may be swung in place for use. On the shaft end is rotatably mounted the sleeve 3, forming support for the mold. The latter, which is divided diametrically, is composed of the two outer halves 5 and 6, the cover 7, and the inner halves 8 and 9, which latter form the mold proper. The outer half 5 is integral with the sleeve 3, while the other half 6 is attached to the former by means of a shaft or hinge-pin 10, so as to admit of opening the mold, as evident from Fig. 3 and as shown by a dotted line in Fig. 5. The half 6 is held closed by the aid of an arm 11, projecting from the shaft 10 and actuated by a pawl 12, which is kept in its locking position by the spiral spring 14, wound about its pin or shaft 13. The cover 7 is provided with a pipe 15, having a hose extension 16 communicating with the sleeve 3, and it is supported by the arm 17 embracing the pipe 15 and projecting from the shaft 18, about which the cover accordingly can be swung between its two extreme positions. (Indicated in Fig. 1, one by dotted, the other by full-drawn, lines.) The cover when inserted in the mold is retained by the pawl or catch 19 engaging with the arm 20 of the fulcrum-pin of the cover, which arm is actuated by the spring 20×, coiled about its shaft or pin. For disengaging the pawls and opening the mold are provided the arms 21 and 22, attached to the frame, and the lateral projection or swell 24 on the cam-disk 23 of the sleeve 3. When the molding mechanism—i. e., the sleeve 3 and the parts attached to it—is rotated in the direction of the arrow in Fig. 1 from the position indicated in the same figure, the arm 21 will when about three-fourths of a revolution is completed act on the arm 25 of pawl 12, thus releasing the latter and admitting of the mold being opened. Further, the swell 24 acts on the crank 27 of the pawl-shaft or pin 26, thus disengaging the pawl 19 and allowing of opening the cover of the mold, and, finally, the arm 22 acts on the arm 28, located on shaft 10, so that the mold is opened. The hollow shaft 1, into which compressed air is conducted from an air-compressor by the pipe 29, has on the conical surface 30, on which the sleeve 3 can be brought to an air-tight fit by tightening up the screw 31, a hole 32, opposite which when the mold is in its vertical position, Figs. 1 and 4, will come the hose 16, slipped onto a short tube projecting from the sleeve 3, and when the mold is turned downward will come the passage 33 of the sleeve. The said passage runs to the tube 34, projecting from the sleeve, on which tube are mounted on the one hand two forks 35 and 36, in which the blowpipe is inserted, and on the other hand an angular cross-piece, one arm 38 of which carries a small funnel 39, where the nozzle 40 of the blowpipe can be inserted, and the other arm 41 of which embraces a rod 42, provided with a roller 43, running on the cam 23. The fork 35 is fixed on the tube 34, whereas the fork 36 and cross-piece 38 41 can slide to and fro upon it. The former 36 is set in motion by the lateral groove 44 of the cam 23, Fig. 1, in which groove runs a pin or roller 45, mounted on a rod 46, connected to the side arm 47, projecting from the fork 36, Fig. 4. The inner end of rod 46 is slotted and embraces the screw 31, by which it is guided, while the outer end of the rod is tubular, Fig. 3, and contains a spiral spring 48, striving to move the interior rod 42 in the direction of the cam 23. The funnel 39 is in communication with the tube 34 by means of the hose 49. The parts 8 and 9 of the mold are provided with flanges 50 on the outside, by means of which they firmly embrace or are inserted between the flanges 51 of the outer mold, so as to be steadily located in the latter. They can accordingly be readily exchanged for others which are larger or smaller inside, according to the size desired of the ingot. The ends 8 9 of the inner mold have a conical surface fitting accurately at one end with the cover 7 and at the other with the blowpipe 37, Fig. 2. The cover 7 has a small valve 52, Fig. 10, held closed by a spring, but adapted to be opened inward in the mold for transmitting the compressed air from the shaft 1.

The parts of the blowpipe, Figs. 6 to 9, are the inner tube 53 and the outer tubes 54, 55, and 56, of which 54 can slide in 55 and 55 is inserted in 56, which can slide on 55. The outer end of tube 53, terminating in the nozzle 40, is provided with threads of a coarse pitch, and in the threads enters as a nut the tube 54, so that the tube 53 can be made to revolve about its axis by sliding the tube 54. There is, moreover, a threaded portion with smaller pitch at the middle of tube 53, engaging with the tube 55. When the tube 53 is made to revolve by sliding the tube 54, there will, owing to the engagement of the threads with tube 55, occur a longitudinal shifting of tube 53 in one direction or the other, depending on the direction in which tube 54 is shifted. The tube 53, which forms the plunger mentioned in the beginning of this specification, has at the front a threaded plug 57, provided with a valve 58, said plug serving to shape the threaded mouth of the bottle. The enlarged end of tube 55 and the cheeks 59, located around said end in the enlarged end of tube 56, determine the external shape of the rim or head of the bottle. The cheeks, of which there are four or a greater number, enter by means of a small flange 60 in a groove of tube 55 and are held together by the tube 56, which is held pressed backward on tube 55 by the spiral spring 61. If the tube 56 is pushed forward, which is done by hand, its conical surface 62 will act on the lower outside edges of the cheeks 59, causing the cheeks to spread, as indicated by dotted lines in Fig. 9, and thereby providing room for the head of the bottle to leave the blowpipe. The tube 55 is embraced by the fork 35 and tube 54 by the fork 36. A key 63 prevents the tube 54 from turning in tube 55. For revolving the mechanism (sleeve 3) the operator grasps the handle 64. When the mechanism is in the position shown in Figs. 2 and 3, which may be considered the starting position, the blowpipe becomes inserted, the parts of the said pipe then occupying in it the respective positions shown in Fig. 7. The mechanism is then revolved into the vertical position shown in Fig. 1. The cover 7, released by the disengagement of pawl 19, is opened and the mold is closed. While the mechanism is rotated to the position in Fig. 1, the rod 46 is pushed inward by the cam 23, so that the plunger 53 is moved into the advanced position in the blowpipe. (Shown in Fig. 6.) The rod 42 likewise moves inward, so that the funnel 39 is slipped onto the nozzle 40 of the blowpipe. A suitable quantity of glass is now introduced in the mold, and the cover is put on. The mechanism is subsequently revolved farther without pause in the direction of the arrow in Fig. 2 to the starting position, Fig. 2. In the beginning of said rotary movement the hose 16 arrives opposite the aperture 32, and the compressed air entering the mold from above forces down the glass into the contracted portion of the mold and into the blowpipe, so as to fill the mold 57 55 59 of the latter, described above, Fig. 10. In Fig. 4 the hole 32 is situated in the plane of the paper, though according to the above it should have such a position that the hose 16 will not coincide with it until the mechanism has been moved slightly past the vertical center-line. In the continued rotation of the mechanism the hole 32 is closed. When the mechanism has arrived in its upside-down position, as compared with Fig. 1, the passage 33 is brought opposite the hole 32, and the air enters through tube 34, hose 49, funnel 39, and the blowpipe into the molten glass, which is thereby given the shape of a hollow ingot filling the mold 8 9. In the continued movement of the mechanism the rod 46 is moved outward by the groove 44, and the plug 57 (tube 53) is thereby moved back to the position in Fig. 7 with a helical movement, injury to the threads formed by the plug 57 in the neck of the bottle being thus prevented. The rod 42 and consequently the funnel 39 are simultaneously moved outward by the cam 23, thus leaving room for the outward motion of tube 53. To facilitate the turning of tube 53, a rotatable bush 65 is inserted in the funnel 39, in which bush the nozzle 40 fits. During the last quarter of a revolution of the mechanism, counting from the position in Fig. 2, the mold is finally opened by the arm 22, so that when the position in Fig. 2 is reached the ingot will lie freely in the mold, to be taken out by lifting up the blowpipe from the upwardly-pointing forks 35 36. The ingot which is retained on the blowpipe by the cheeks 59 embracing it just below the completed rim or head is then carried to the divided finishing-mold, which may be of the usual kind, and the bottle, &c., is blown ready, Fig. 12. The bottle on being taken out of the finishing-mold is disengaged from the blowpipe by opening the cheeks 59, as described above. The valve 58 opens outward, so as to transmit air when the passage 33 is passing the aperture 32; but at other times it closes the blowpipe, so that glass cannot flow into it when the mold is being filled. It should, moreover, be noted that the groove 44 has such a shape that a slight withdrawal of the plug 58, which tapers slightly outward, takes place already before the arrival of passage 33 opposite the aperture 32 in order that the bottle rim or head while solidifying may not crack in shrinking. On this account no deformation of the rim or head need occur. The cam 23, as mentioned, moves the rod 42 and the funnel 39 outward, and the spring 48 moves the same parts inward. When the roller 43 is not resting on the cam 23, the funnel 39 rests yieldingly, owing to the pressure of the spring 48 on the nozzle of the blowpipe. From the above it is also evident that the transmission and shutting off of the air takes place wholly automatically, and for this reason the operator, apart from the manipulation of the cover 7 and the blowpipe, has nothing to do but revolve the mechanism. The closing of the mold can be effected either by means of a spiral spring wound around the shaft 10 of the movable half of the mold or by hand by a simple movement. To the standard $1^\times$ is attached by means of a spring-arm 66 a roller 67, pressing on the flange 68 of the sleeve 3, said flange being provided with a couple of recesses for the roller to engage with when the mechanism occupies, respectively, the position in Fig. 2 and the vertical position in Fig. 1, which positions are thus fixed.

In the manufacture of bottles with a smooth mouth or neck-opening no rotary movement of tube 53 in the blowpipe is required, and no threads are therefore needed on said tube, the tube 54 being, moreover, omitted and the fork 36 arranged to grasp directly around the tube 53 for direct longitudinal shifting of the latter by means of the rod 46. The arrangement of the blowpipe in said case is more fully seen from Fig. 11, which will be readily understood without further explanation. The groove 44 must then of course have a corresponding suitable shape, so that the movement of tube 53 will approximately equal the length of plug 57. The tube 34 may as regards the support formed by it for the blowpipe be considered as an arm projecting from the sleeve 3 and from which project at an angle the forks carrying the blowpipe.

Having now described my invention, what I claim as new, and desire to secure by Letters Patent, is—

1. The herein-described method of producing a hollow article from glass in a mold having an air-inlet at its bottom and a removable blowpipe in its top, which consists in first putting the molten glass in the mold, then forcing the glass onto and about the blowpipe, whereby it is fixed to the latter, then admitting compressed air into the glass through said blowpipe, to form the hollow in the glass, and finally removing the blowpipe and the glass attached thereto and blowing the article with the breath, substantially as set forth.

2. The herein-described method of producing a hollow article from glass in a mold having a removable blowpipe at its top and an air-inlet at its bottom, which consists in first putting in the molten glass, then forcing said glass to the top of the mold and about the blowpipe with compressed air, whereby an ingot is formed fixed to the blowpipe, then forcing air into the mold from the top to produce a hollow article from the glass, then removing the hollow article, and finally expanding and finishing the body of the article by blowing with the breath, substantially as set forth.

3. The herein-described improvement in the art of molding hollow articles from glass, which consists in fixing the mass of glass to a blowpipe with the aid of compressed air, then admitting compressed air through said pipe to form a hollow in the mass of glass, and then finishing the article by blowing with the breath through said pipe, substantially as set forth.

In witness whereof I have hereunto signed my name in the presence of two subscribing witnesses.

CHRISTIAN CHRISTIANSSON.

Witnesses:
A. L. HAMMARBACK,
KARL LINDEBORG.